United States Patent [19]

Sakata et al.

[11] Patent Number: 4,878,131
[45] Date of Patent: Oct. 31, 1989

[54] REPRODUCING APPARATUS

[75] Inventors: Tsuguhide Sakata, Tokyo; Tomishige Taguchi, Saitama; Norio Kimura; Kunio Tsuruno, both of Tokyo; Yasutomo Suzuki, Kanagawa, all of Japan

[73] Assignee: Canon Kabushiki Kaisha, Tokyo, Japan

[21] Appl. No.: 83,505

[22] Filed: Aug. 7, 1987

[30] Foreign Application Priority Data

Aug. 13, 1986 [JP] Japan .................................. 61-190044

[51] Int. Cl.⁴ ............................................. H04N 5/78
[52] U.S. Cl. .................................. 360/37.1; 358/339; 358/342
[58] Field of Search ............................. 360/33.1, 37.1; 358/335, 339, 342

[56] References Cited

U.S. PATENT DOCUMENTS 4,743,979  5/1988  Okano et al. ......................... 358/339

Primary Examiner—David Mis
Attorney, Agent, or Firm—Robin, Blecker & Daley

[57] ABSTRACT

Disclosed is a reproducing apparatus having synchronizing signal generating means of the self-running type, means for reproducing a video signal from a medium, and means for adding a synchronizing signal produced by the synchronizing signal generating means to the video signal reproduced by the reproducing means, wherein the synchronizing signal produced by the synchronizing signal generating menas of the self-running type is added to the video signal reproduced from the medium.

22 Claims, 3 Drawing Sheets

REPRODUCING APPARATUS

BACKGROUND OF THE INVENTION

1. Field of the Invention

This invention relates to a reproducing apparatus, and more particularly to a reproducing apparatus having capabilities of reading out the video signal stored in a recording medium and to a signal processing device for processing it.

2. Description of the Related Art

As the apparatus in which the reproduced signal from the recording medium has once been written in memory means and the written signal in the aforesaid memory means is read out to perform, for example, a still picture reproduction, a VTR having a field memory or the like is known.

In the case of a conventional apparatus, since the signal recorded in the medium accords with the requirements for the standard television signal, reproduction is carried out in such a manner that the first and second fields alternate with each other, as one frame is followed by another. When in the still picture mode, the video signal for one of the two fields with inclusion of the horizontal synchronizing signal is taken in the field memory in the middle of the course of reproduction, and then the aforesaid field memory is read out to obtain the signal continuously.

Since, in this case, the information memorized in the field memory represents only one of the two fields, if the signal is only read from the field memory continuously, a skew distortion will result. In general, therefore, in order to compensate for the skew distortion, arrangement has been made so that a pseudo-frame picture is reproduced, appearing as a picture for the first field or the second field.

However, for, as the still picture is being reproduced in such a manner, the apparatus is switched again to reproduce the video signal from the medium, if, on assumption that this transition coincides with the reproduction of the picture for the first field, the next video signal reproduced from the field memory is for the second field, no problem will arise. If it is for the first field, the skew distortion will result at the time of transition. This led to a problem that the picture is disturbed.

Also, in the still video system now being developed, a magnetic sheet whose concentric tracks each record video signals for one field is used. In such a system, the different fields, say, first and second fields, are not always recorded in the adjacent two of the concentric tracks. In other words, when the magnetic head runs in the radial direction of the magnetic sheet at a high speed, reproduction in the field is not always followed by that in the second field.

Therefore, in the above-described still video system, when the head is made to run on the magnetic sheet at a high speed, for example, about 10 tracks a second, the pictures to be reproduced by the head are not always reproduced continuously in such a manner that the first field is followed by the second field. Hence, the reproduced picture is disturbed largely each time the head is moved from track to track. Thus, a problem was produced that the deterioration of the image quality was very large.

SUMMARY OF THE INVENTION

A first object of the invention is to eliminate the above-described problems either individually or all at once.

A second object is to provide an apparatus for reproducing the video signal from the medium by the magnetic head or like reproducing means, wherein even if the synchronizing signal of the video signal is out of coincidence, such a distortion as has been described above is not produced.

Under such objects, according to a preferred embodiment of the invention, a reproducing apparatus is disclosed that has synchronizing signal generating means of the self-running type, means for reproducing the video signal from the medium and means for adding the synchronizing signal produced from the synchronizing signal generating means to the video signal reproduced by the reproducing means, in which the synchronizing signal generated from the synchronizing signal generating means of the self-running type is added to the video signal reproduced from the medium.

Another object of the invention is to provide a reproducing apparatus of the type in which the recorded information is reproduced by the reproducing head moving on the medium, whereby regardless of what value the moving speed of the reproducing head takes, any noise or any skew distortion does not occur.

Still another object of the invention is to provide a reproducing apparatus in which the video signal reproduced by the reproducing head is written in and read from the memory in such a manner that the video signal to be applied to the monitor is prevented from suffering a synchronism distortion.

A further object of the invention is to provide a novel signal processing device.

Under such an object, according to a preferred embodiment of the invention, a signal processing device is disclosed that has means for generating a synchronizing signal whose phase is in coincidence with the synchronizing signal of the supplied video signal input, a memory in which the inputted video signal is written, means for reading the written video signal in the memory, and means for adding the synchronizing signal generated from the generating means to the video signal read by the reading means.

Other objects and features of the invention will become apparent from the following description of embodiments thereof with reference to the drawings.

DETAILED DESCRIPTION OF THE PREFERRED EMBODIMENTS

In the embodiments of the invention to be described below, a reproducing apparatus using a disc-shaped magnetic sheet from which the video signal is reproduced will be explained. But, the present invention is not confined to such a sort of the medium. It is to be understood that the medium may be of the photorecording type, or that nothing is specified for the shape of medium.

Figure 1:
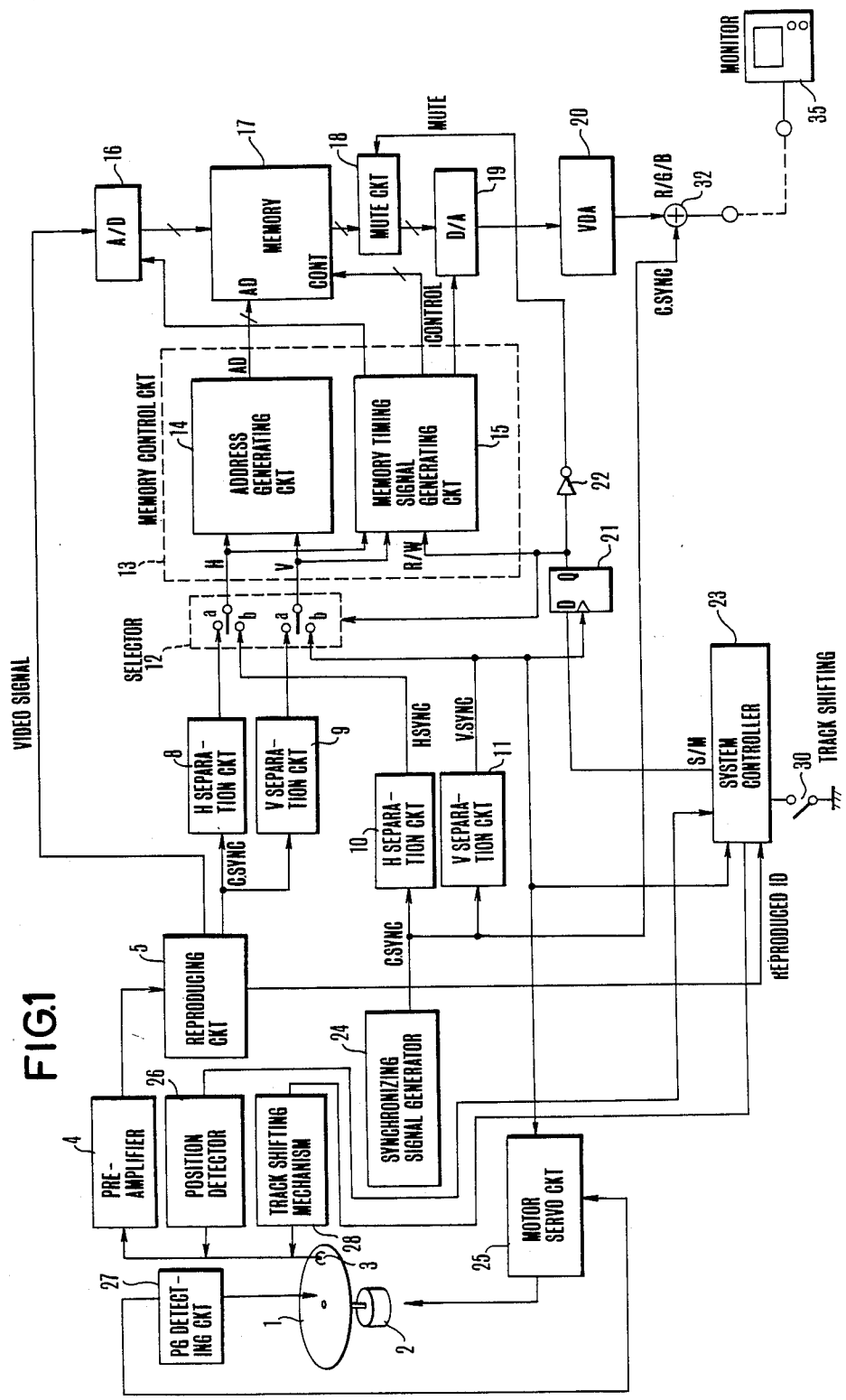
FIG. 1 is a block diagram of an embodiment of a reproducing apparatus according to the present invention.

FIG. 1 is a block diagram of an embodiment of the reproducing apparatus according to the invention.

Figure 4:
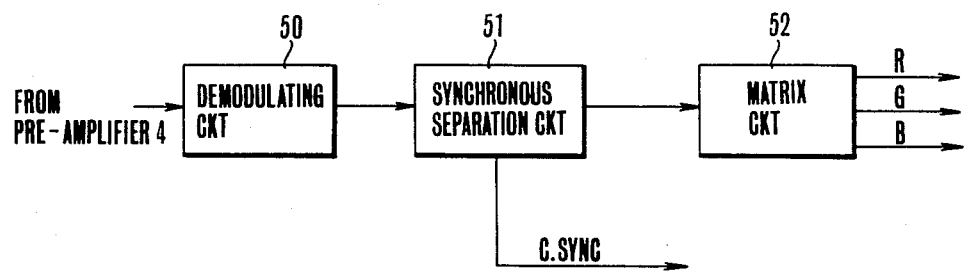
FIG. 4 is a block diagram of the main parts of the reproducing circuit 5 of FIG. 1.

In FIG. 1, 1 is a magnetic sheet called still video floppy on which a great number of concentric tracks 7 whose width is 60 microns are formed in spaced relation to each other by a guard band 6 of 40 microns in width. An electric motor 2 drives rotation of the sheet 1. The output of a head 3 is amplified by a pre-amplifier 4. A reproducing circuit 5 includes, as shown in FIG. 4, a demodulating circuit 50, a synchronous separation circuit 51 and a matrix circuit 52 for obtaining R, G and B component video signals from the reproduced output.

For note, the video signal recorded in the magnetic sheet 1 includes an H (horizontal) synchronizing signal, a V (vertical) synchronizing signal, and an ID signal indicating whether the field recording was made in only one track, or the frame recording was made over two tracks, in other words, the successive two fields were recorded in the adjacent two of the tracks.

8 and 10 are H (horizontal) synchronizing signal separation circuits; 9 and 11 are V (vertical) synchronizing signal separation circuits; and 12 is a selector having switched positions depending on the output of a D type flip-flop to be described later. 13 is a memory control circuit; 14 is an address generating circuit which is a constituent part of the memory control circuit 13. Responsive to the inputs of the H synchronizing signal and V synchronizing signal, it generates addresses in sequence. A memory timing signal generating circuit 15 which is another constituent part of the memory control circuit 13 controls the reading and writing of a memory 17, depending on the output of a D-type flip-flop to be described later. An A/D converter 16 operates with a sampling clock produced from the memory control circuit 13. 17 is the memory circuit. 18 is a mute circuit. A D/A converter 19 operates with a clock produced from the memory control circuit 13. (In practice, an A/D converter and D/A converter are provided for each of R, G and B component signals.) 20 is a video amplifier. 21 is a D type flip-flop for taking the V synchronous timing. 22 is an inverter. 23 is a system controller. 24 is a synchronizing signal generator. A motor servo circuit 25 operates in such a manner that a motor 2 rotates so that a PG signal detected by a PG detecting circuit to be described later and the V synchronizing signal generated from the synchronizing signal generator 24 synchronize with each other. 26 is a detector for the position of a magnetic head 3. 27 is a PG detecting circuit for detecting the phase of rotation of the magnetic sheet 1 by detecting a prescribed angle of the sheet 1 and a buried metal piece. A track shifting mechanism 28 moves a head 3 on the sheet 1 to the radial direction in response to a signal from the system controller 23.

30 is a track shifting switch which commands the system controller 23 to produce a signal for moving the head 3.

32 is an adder for adding a composite synchronizing signal C.SYNC and the output of the video amplifier 20. 35 is a monitor connected to the outside.

The operation of the reproducing apparatus of one embodiment of the invention is next described by reference to the drawings.

The composite synchronizing signal C.SYNC from the synchronizing signal generator 24 having a quartz oscillator of, for example, 4 fsc as the original oscillation is sent to the H separation circuit 10 and the V separation circuit 11. In these separation circuits, the V synchronizing signal and the H synchronizing signal are respectively separated from the composite synchronizing signal C.SYNC. Among these, the V synchronizing signal is sent to the selector 12, D type flip-flop 21, system controller 23 and motor servo circuit 25. The motor servo circuit 25 makes control with the V synchronizing signal as the reference of the rotation phase, and the rotation phase control of the motor 2 is performed so that the phase relation of the PG pulse obtained as the output of the PG detecting circuit 27 and the V synchronizing signal becomes a prescribed value. The aforesaid rotation control results in that the magnetic sheet 1 obtains a prescribed rotation phase, so that, as shown in FIG. 2, phase synchronism is taken between the reproduced V synchronizing signal to be described later and the reference V synchronizing signal obtained from the above-described synchronizing signal generator 24.

The record information detected by the head 3 is amplified by the pre-amplifier 4, and sent to the reproducing circuit 5. In the reproducing circuit 5, the reproduced video signal is produced in the form of R, G, B, C.SYNC. The composite synchronizing signal C.SYNC is sent to the H separation circuit 8 and the V separation circuit 9, where the H synchronizing signal and the V synchronizing signal are respectively separated. They are sent as the reference synchronizing signals of the time of memory writing to the selector 12. Meanwhile, the reproduced RGB video signals without the synchronizing signals are sent to the A/D converter 16, where they each are converted to 8-bit digital data. They are then sent to the memory 17. Here, in actual practice, a low pass filter is used in front of the A/D converter 16 in order to prevent folded distortion. But, on explanation, it is omitted. Now, in the time of writing into the memory, the aforesaid selector 12 is selected in its "a" position. Therefore, the outputs of the H separation circuit 8 and the V separation circuit 9 are sent to the address generating circuit 14 and the memory timing signal generating circuit 15. This address generating circuit 14 generates a write address to control the addressing of the memory 17. Meanwhile, the memory timing signal generating circuit 15 generates a read/write control signal, for example, when the memory 17 is constructed with DRAM, RAS (row address selection), CAS (column address selection) and WE (write control), which are sent also to the memory 17. By the co-operation of the aforesaid address signals and the read/write control signal, the aforesaid A/D-converted video digital data are written in the memory 17.

Figure 2:
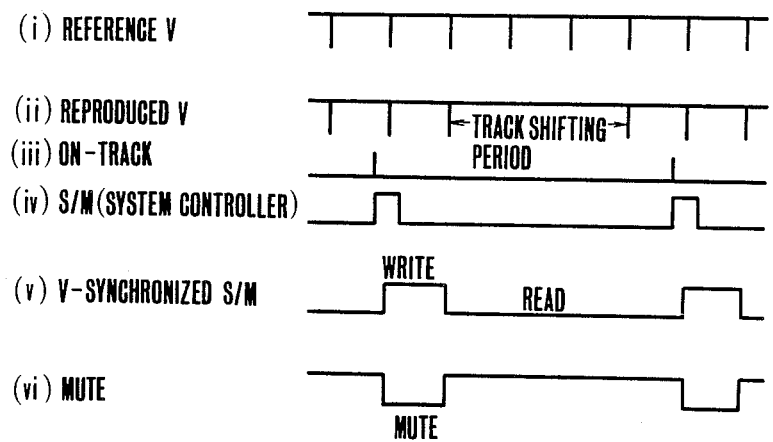
FIG. 2 is a pulse timing chart illustrating a manner in which the apparatus of FIG. 1 operates.

Here, the timing of the writing is controlled by the system controller 23, or in accordance with, for example, a signal labeled S/M in FIG. 2 produced from the system controller 23 on the basis of the on-track signal representing that the head 3 has accessed the track in between the guard bands, which is obtained from the position detector 26 for the head 3 when the head 3 is moved by the track shifting switch 30, and the V synchronizing signal from the V separation circuit 11.

The S/M (write source/memory) signal from the system controller 23 is taken in accurate synchronism with the reference V synchronizing signal by the D type flip-flop 21, becoming the V-synchronized S/M signal on line (v) of FIG. 2. This signal is sent to the memory timing signal generating circuit 15. During the period that the S/M signal is, for example, high, the memory timing signal generating circuit 15 is controlled in the write mode. Also, because the V-synchronized S/M signal is the control signal for the selector 12 too, the selector 12 is set in its "a" position during the period that it is, for example, high.

For note, during the writing period of the memory 17, the output of the memory 17 is muted by a mute signal obtained by inverting that V-synchronized S/M signal. For note, FIG. 2 is a timing chart of the reference V synchronizing signal (shown on line (i)) obtained from the synchronizing signal generator 24 when the field is reproduced, the reproduced V synchronizing signal (on line (ii)) at the output of the V separation circuit 9, the above-described on-track signal (on line (iii)), the above-described S/M signal (on line (iv)) the V-synchronized S/M signal (on line (V)) and the mute signal (on line (vi)).

After the writing, the reading is carried out as follows: As the V-synchronized S/M signal shown on line (v) of FIG. 2 becomes low, when the apparatus is switched to the read mode, the selector 12 is moved to its "b" position. Therefore, the H synchronizing and the V synchronizing are carried out depending on the output of the synchronizing signal generator 24. Therefore, the address generating circuit 14 produces the read address in synchronism with these H and V, which are sent to the memory 17. Meanwhile, the memory timing signal generating circuit 15 is set in the read mode by the change of the V-synchronized S/M signal from the D type flip-flop 21, producing the read control signals RAS, CAS and WE, which are then sent to the memory 17.

By supplying these read address and read control signals to the memory 17, the written video data are read from the memory 17 and sent to the mute circuit 18. Since, when reading, the mute circuit 18 is released from the muting operation by the inverted signal of the V-synchronized S/M signal, the video data are sent to the D/A converter 19. Based on the sampling clock from the memory timing signal generating circuit 15, the D/A converter 19 converts them to an analog signal which is then sent to the video amplifier 20. The video amplifier 20 converts the inputted signal to a prescribed level and a prescribed output impedance, and produces the output at the RGB video signal output terminal As the composite synchronizing signal for the aforesaid output picture, the reference signal C.SYNC is always produced from the synchronizing signal generator 24.

Figure 3:
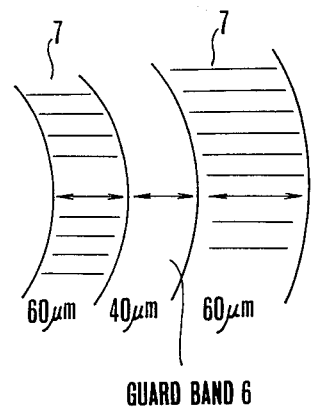
FIG. 3 is a schematic view illustrating the array of tracks on the magnetic sheet of FIG. 1.

According to the above-described embodiment of the invention, because the reproduced output is made obtained through the memory 17 when the head 3 is fast moved, the influence of the noise produced when the head 3 moves across the guard band 6 shown in FIG. 3 can be as far minimized as possible.

That is, in the case when the output of the head 3 is outputted not through the memory 17 but directly, each time the head 3 moves one track, the noise due to the guard band appears in the picture. If the movement of the head 3 was as fast as, for example, 10 tracks a second, the noise became very unpleasant to the viewer.

So, if the picture is muted during the fast moving of the head 3, the presentation of such noise to the picture can be avoided. But, in order to sufficiently prevent the noise, the muting must be performed over several V periods. Therefore, in the case when the moving of the head 3 is fast, the time the head 3 takes to pass the guard band 6 becomes long compared with the time it takes to lie on the track 7. This led to a problem that the picture became very unpleasant.

According to this embodiment, the reproduced output of the head 3 is once stored in the memory 17. This permits the picture to be presented on the monitor 35 even during the period of movement of the head 3 from track to track. Thus, the influence due to the guard band can be prevented from occurring.

For note, the reason that, in this embodiment, the mute circuit 18 is provided for muting the output signal of the memory 17 during the writing period of the memory 17 is explained below.

In the apparatus of this embodiment, the signal reproduced by the reproducing circuit 5 after having been A/D converted is once written in the memory 17 as has been described above. During this time, the output signal of the A/D converter 16 is applied, as it stands, to the D/A converter 19.

Therefore, it is during the writing period of the memory 17 that the video signal outputted from the video amplifier 20 is in synchronism with the H synchronizing signal and the V synchronizing signal reproduced from the magnetic sheet 1.

Meanwhile, during the time when the writing in the memory 17 is not performed, or when the reading is carried out, the video signal produced from the video amplifier 20 is not in synchronism with the H and V synchronizing signals reproduced from the magnetic sheet 1, but with those produced from the synchronizing signal generator 24 and separated by the H and V separation circuits 10 and 11.

Here, in the synchronizing signal reproduced from the magnetic sheet 1, there is a jitter due to the rotation difference of the motor 2. Therefore, the perfect synchronism is not always taken between it and the H synchronizing signal separated by the H separation circuit 10.

Therefore, when the state changes from the state of performing the reading from the memory 17 to the state of performing the writing of the memory 17, the synchronism error of the H synchronizing signal is produced, giving rise to a problem that, as it is observed on the monitor, the picture is instantaneously distorted by that synchronism gap. Particularly when the head 3 is fast moved as it accesses the tracks on the magnetic sheet 1, such a defect on the picture is very prominent. This constituted a large cause of deteriorating the picture quality.

So, in the embodiment of the invention, it is in the writing period of the memory 17 that the picture is once muted by the mute circuit 18, and that the reproduced output is combined with the synchronizing signal produced from the synchronizing signal generator 24, thereby the above-described picture distortion is made not prominent.

For note, since the mute circuit 18 is rendered operative for a time equal to only one V period, the picture quality is hardly deteriorated by the muting.

By one embodiment of the invention described above, the following advantages are produced:

(1) Since the above-described on-track signal etc., when the picture is present, work to effect freezing for the period of 1V, and, after that, the memory reproduced picture is outputted, no noise bar which would otherwise be produced when the track sending across the guard bands is performed is produced.

(2) Since the composite synchronizing signal for use as the picture signal has its C.SYNC signal always produced from the synchronizing signal generator, no skew distortion appears in the picture on the monitor as the fast moving goes on.

(3) Since, when to freeze into the picture memory, the picture signal output is muted for the corresponding period (in this embodiment, the period of 1V, or, in the case of the frame freezing, of 2V), a somewhat bent picture due to the jitter is not reproducing during the freezing period. Thus, a very stabilized picture reproduction is realized even when fast moving.

Though the foregoing embodiment has been described by taking an example of the video signal reproduced from the magnetic disc, the present invention is not confined thereto, and is applicable even to other types of media.

As has been described above, according to the present invention, because a new synchronizing signal of self-running property is added to the video signal reproduced from the medium, it is made possible to reproduce a distortion-free picture on the monitor with a very high stability.

What is claimed is:

1. An image reproducing apparatus comprising:
   (a) reproducing means for reproducing an image signal recorded on a medium;
   (b) an image memory;
   (c) an address controller for generating an access address control signal for said image memory in response to a synchronizing signal applied thereto;
   (d) first synchronizing signal generating means;
   (e) second synchronizing signal generating means for generating a synchronizing signal synchronized with the image signal reproduced by said reproducing means; and
   (f) change-over means for selecting either of said first synchronizing signal generating means or said second synchronizing signal generating means to apply a signal to said address controller, said change-over means being arranged to apply the synchronizing signal generated by said second generating means to said address controller at the time of writing the image signal into said image memory and to apply the synchronizing signal generated by said first generating means to said address controller at the time of reading the image signal from said image memory.

2. An apparatus according to claim 1, wherein said reproducing means ncludes:
   (a) a reproducing head; and
   (b) driving means for driving said head and said medium to produce relative rotation thereof.

3. An apparatus according to claim 2, wherein said driving means is arranged to drive said head and said medium to produce the relative rotation thereof so that the synchronizing signal generated by said first synchronizing signal generating means and the synchronizing signal generated by said second synchronizing signal generating means are synchronized in phase.

4. An apparatus according to claim 1, wherein said medium is disc-shaped.

5. An apparatus according to claim 1, wherein said memory is arranged to be capable of storing the image signal of one picture plane.

6. An apparatus according to claim 1, wherein said second synchronizing signal generating means is a separating circuit for separating the synchronizing signal from the reproduced signal.

7. An apparatus according to claim 1, wherein both of said first and second synchronizing signal generating means are arranged to generate horizontal and vertical synchronizing signals.

8. An apparatus according to claim 2, further comprising:
   control means for controlling said change-over means to effect change-over operation in response to an instruction for changing a position of said reproducing head relative to said medium.

9. An apparatus according to claim 1, wherein said address controller includes a counter which is arranged to be reset by the synchronizing signal applied thereto.

10. An image processing apparatus in which an image signal recorded on a medium is once stored in an image memory and then processed, comprising:
    (a) an address controller for generating an access address control signal for said image memory in response to a synchronizing signal applied thereto;
    (b) first synchronizing signal generating means;
    (c) second synchronizing signal generating means for generating a synchronizing signal synchronized with said image signal; and
    (d) change-over means for selecting either of said first synchronizing signal generating means or said second synchronizing signal generating means to apply a signal to said address controller, said change-over means being arranged to apply the synchronizing signal generated by said second generating means to said address controller at the time of writing the image signal into said image memory and to apply the synchronizing signal generated by said first generating means to said address controller at the time of reading the image signal from said image memory.

11. An apparatus according to claim 10, further comprising:
    (e) a reproducing head; and
    (f) driving means for driving said head and said medium to produce relative rotation thereof.

12. An apparatus according to claim 11, wherein said driving means is arranged to drive said head and said medium to produce the relative rotation therof so that the synchronizing signal generated by said first synchronizing signal generating means and the synchronizing signal generated by said second synchronizing signal generating means are synchronized in phase.

13. An apparatus according to claim 10, wherein said medium is disc-shaped.

14. An apparatus according to claim 10, wherein said memory is arranged to be capable of storing the image signal of one picture plane.

15. An apparatus according to claim 10, wherein said second synchronizing signal generating means is a separating circuit for separating the synchronizing signal from the reproduced signal.

16. An apparatus according to claim 10, wherein both of said first and second synchronizing signal generating means are arranged to generate horizontal and vertical synchronizing signals.

17. An apparatus according to claim 16, further comprising:
    control means for controlling said change-over means to effect change-over operation in response to an instruction for changing a position of said reproducing head relative to said medium.

18. An image reproducing apparatus, comprising:

(a) reproducing means including a movable reproducing head for reproducing an image signal from a medium on which the image signal is recorded, said reproducing means being arranged to produce an on-tract signal every time when said reproducing head is displaced onto a position where the image signal is to be recorded;

(b) means for producing a synchronizing signal and causing a phase synchronism to occur between said synchronizing signal and a synchronizing signal of the image signal reproduced by said reproducing means;

(c) a memory into which said image signal is written;

(d) writing means for writing said image signal into said memory in response to said on-tract signal;

(e) reading means for reading the image signal written into said memory upon completion of writing operation of said writing means; and (f) means for adding the synchronizing signal produced by said producing means to the image signal read from said reading means.

19. A device according to claims 18, further comprising:

(g) means for prohibiting said image signal from being outputted when said image signal is written in said memory.

20. A device according to claim 19, wherein said adding means is a means for allowing the synchronizing signal reproduced by said producing means to be outputted even when the outputting of said image signal is prohibited by said prohibiting means.

21. A device according to claim 18, wherein said memory is a memory capable of writing a video signal for at least one picture frame therein.

22. An apparatus according to claim 18, wherein said writing means is arranged to write said input image signal into said memory only after both of said on-track signal and the vertical synchronizing signal of the input image signal have been obtained.

* * * * *